United States Patent [19]
Boatman et al.

[11] 3,870,953
[45] Mar. 11, 1975

[54] IN CIRCUIT ELECTRONIC COMPONENT TESTER

[75] Inventors: Roger M. Boatman, Titusville; Melvin R. Hall, Castleberry, both of Fla.

[73] Assignee: Roger Boatman & Associates, Inc., Titusville, Fla.

[22] Filed: Aug. 1, 1972

[21] Appl. No.: 277,085

[52] U.S. Cl............................ 324/73 R, 324/158 T
[51] Int. Cl............................................ G01r 15/12
[58] Field of Search ......... 324/73 R, 73 PC, 73 AT, 324/158 R, 158 T

[56] References Cited
UNITED STATES PATENTS

| | | | |
|---|---|---|---|
| 3,051,900 | 8/1962 | Zechter et al..................... | 324/73 R |
| 3,431,494 | 3/1969 | Ryan.............................. | 324/158 T |
| 3,445,769 | 5/1969 | Erath............................. | 324/158 R |
| 3,577,073 | 5/1971 | Cray.............................. | 324/73 R |
| 3,667,037 | 5/1972 | Kierce............................ | 324/73 R |
| 3,673,397 | 6/1972 | Schaefer......................... | 324/73 R |
| 3,723,868 | 3/1973 | Foster............................ | 324/73 AT |

FOREIGN PATENTS OR APPLICATIONS

| | | | |
|---|---|---|---|
| 1,245,350 | 9/1971 | Great Britain.................... | 324/73 R |

OTHER PUBLICATIONS

Continental Device Corp. Publication, Pulsed/DC Common Base Test System; Mar. 1, 1966.
Pulse Technique Measures Power Transistor D.C. Parameters, Electronic Design; p. 745, Mar. 1961.
Sommerfield, E.; Transistor Tester, IBM Tech. Bull., Vol. 4, No. 5, Oct. 1961, p. 32.
"In Circuit" Transistor Tester, Production Devices Publication, Received by Patent Office Dec. 1970.
Semitest III, A Test Instrument for Logic IC's, News from Rohde & Schwarz, No. 41, Vol. 10, 1970, pp. 9-10.

*Primary Examiner*—Robert J. Corcoran
*Attorney, Agent, or Firm*—Burns, Doane, Swecker & Mathis

[57] ABSTRACT

Test apparatus which is adapted to test circuit components while connected to a printed circuit board. The described apparatus is capable of functionally testing dual in-line, sixteen-terminal, integrated circuit components and to supply all of the power necessary for exercising the IC while the printed circuit board is removed from the equipment. Selected terminals of the IC package are provided with operating power level voltages, other terminals are applied with signal voltages, and the voltages on other terminals are compared with predicted voltages. The signal voltages are driven with sufficient power to force the IC through its expected mode of operation, and the duration of the test interval is maintained sufficiently small, on the order of less than $10\mu$ seconds and normally less than $1\mu$ second to avoid damage to other components on the circuit board.

38 Claims, 12 Drawing Figures

IN CIRCUIT ELECTRONIC COMPONENT TESTER

This invention relates to apparatus and methods for testing electrical circuits and circuit components such as integrated circuits (IC) or transistors, while they are mounted on a circuit board. The test apparatus as described provides the voltage levels and signals necessary for testing the circuits or circuit components to thus allow the circuit board to be completely removed, when desired, from the system in which it is adapted to be used.

Modern electronic equipment used for data processing comprises a very large number of printed circuit boards on which separate electronic components are mounted. With the advent of medium and large scale integration, the electronic components are frequently packaged in housings having a large number of terminals. Present-day integrated circuits, using diode transistor logic and transistor-transistor logic, are available in housings having dual rows of in-line terminals with seven or eight terminals in each row.

In the event of faulty operation of the electronic equipment, it is the custom to locate the printed circuit board, or group of boards, which contain the defect. In circuit boards which carry a limited number of plug-in discrete circuit components, such as diodes, transistors, etc., test equipment is available which makes identification of the defective components on a removed board relatively simple, after removing the defective boards from the system. However, where each printed circuit board carries a relatively high number, for example up to 200, of circuit components that are soldered to the circuit board, removal of the circuit components for testing is not feasible. Where some or all of the components are IC units each containing a considerable number of elementary circuits in various combinations, the task of locating the particular IC housing which contains the defective circuit is quite difficult.

Test equipment for checking IC components after manufacture and before installation on a printed circuit board is well known. A description of such techniques and of available test equipment is contained in the article "An Introduction to IC Testing," by Frederick van Veen, *IEEE Spectrum*, December 1971, pp. 28 through 37. The apparatus discussed in this article cannot be used to test ICs when mounted on a circuit board since, on a circuit board, the ICs are electrically connected to each other and any effort to test a single IC is frustrated by reason of the influence of other ICs on the circuit board that are directly connected to the terminals of the IC under test. Since unsoldering IC packages to enable their removal from a circuit board for test and remounting the good packages back on the circuit board is not considered practical, trouble-shooting apparatus has been designed for checking an entire circuit board. One such system is disclosed in the U.S. Pat. No. 3,657,527, to Kassabgi et al. Other equipment is available which generates a repeatable number of voltage level changes. From this number, a truth table analysis will determine the number of output pulses from the board. An alternative method of determination is to use a known good board under test conditions and record its output for use as a standard.

Another technique that has been employed is by use of a signal tracing technique. In this system, a signal generator is connected at the input of the circuit board and the trouble-shooter follows the signal until he finds the point where it disappears. Unfortunately, this method does not work with digital circuits using DTL or TTL logic. Other equipment has employed the use of a field-strength meter which can detect the difference between normally clamped gates and normally open gates. Such apparatus has usually required the use of probes which must engage only one terminal of an IC package at a time while the trouble-shooter is manipulating the test equipment. Since the terminals on an IC device are very close together, accessing the terminals on an individual basis by a single probe is indeed difficult.

It is an object of the present invention to provide for the troubleshooting of printed circuit boards having soldered in place electrical components such as IC housings, a novel method and apparatus which allow a defective component to be identified while all of the components remain connected to the printed circuit board. The apparatus involved is comparatively small test equipment which is adapted to supply all of the operating voltages necessary for the testing of the components in seriatim. Each component is accessed individually, either while the board is connected to the equipment, or when it is totally removed and a substitute board placed in the equipment which is then ready for use, and the defective printed circuit board returned to a repair center for troubleshooting; or alternatively, the repairman can carry the apparatus of the present invention with him and perform the troubleshooting at the site of the equipment.

Another object is to provide a novel method and apparatus for the testing of the individual IC unit on a printed circuit board without the need for a comparison board. Instead, the present invention contemplates the controlling of the test apparatus to perform single-step, or sequential, analysis of the IC unit without damage to any associated subsystem, whether in the operating equipment, or on the printed circuit board when it is removed and powered by the test instrument.

A further object is to provide a novel troubleshooting system for circuit components on a printed circuit board which does not require removal of suspect components for testing, nor does it require the printed circuit board to remain in the system for exercising the components on the circuit board through their various functions. The power and signal voltages may be supplied from the test equipment in such sequence that each component package and each of the individual circuits therein can be thoroughly checked on an individual basis without damage to the component under test or to any other component on the circuit board. The performance checks monitored by the apparatus of the present invention may include predict and compare circuits which provide exact failure detection. In the case of counter functions, a step-by-step check of the operation of the counter may be performed with each logic or element failure isolated and identified, and, in the case of gate counters, a counter position failure may be isolated.

Still a further object resides in providing a novel method and apparatus for testing IC units whie they are mounted on a circuit board containing additional IC units whereby powering-up of the IC unit under test inherently powers-up certain other IC units on the printed circuit and wherein the test signals for exercising the IC unit under test are applied at a voltage and current level sufficient to force the IC unit under examination through its functional tests, but employ insufficient energy to cause damage to any other component or IC unit on the circuit board. The test apparatus may be controlled or programmed through the construction of a truth table analysis based on the logic diagram for the printed circuit board and each test performed in a fraction of a second with the signal voltages being applied for a period insufficient to cause damage to any circuit components and preferably for a period not exceeding approximately $10\mu$ seconds. At the end of the test period, the voltages appearing on each of the terminals of the IC housing under test may be stored in a register and the operating power from the test equipment turned off. The signals in the storage register are then compared with signals stored in the predict register and an indication provided to identify any terminal which fails to perform as predicted.

Still a further object is to provide a novel method and apparatus for checking gate counter circuits wherein preliminary signals first clear the counter and then enter into the counter a predetermined count, and then, during the test period, a selectable number of pulses are added to the counter and the comparison then made at the end of the test period.

Another object of the invention is to provide a novel current driver circuit wherein a pair of current conducting devices, such as transistors, are connected in series between positive and negative poles of the power supply of the test apparatus, and control circuits are provided which optionally produce on an output terminal either a positive or negative voltage level or leave the output terminal floating. By providing separate driver circuits for each terminal of the device to be tested, the polarity of the voltage applied between any two terminals of the device to be tested can be reversed. By providing three separate driver circuits, the voltages can be supplied sequentially to thereby allow the active circuit under test to first assume a stable condition before the third voltage is supplied; and all the voltages can be terminated simultaneously at the end of the test period.

Still another object is to provide a novel transistor test circuit usable when the transistor is wired in a circuit and without causing damage to other components wired in the circuit, where a voltage of a first polarity is applied across the emitter-collector terminals and thereafter the base is pulsed; then a voltage of reversed polarity is applied across the emitter-collector terminals and the base is again pulsed; and an indication is produced that indicates whether the transistor is an NPN, a PNP, or is faulty.

These and other objects of the invention will become more fully apparent from the claims, and from the description as it proceeds in connection with the drawings wherein:

GENERAL DESCRIPTION

Figure 1:
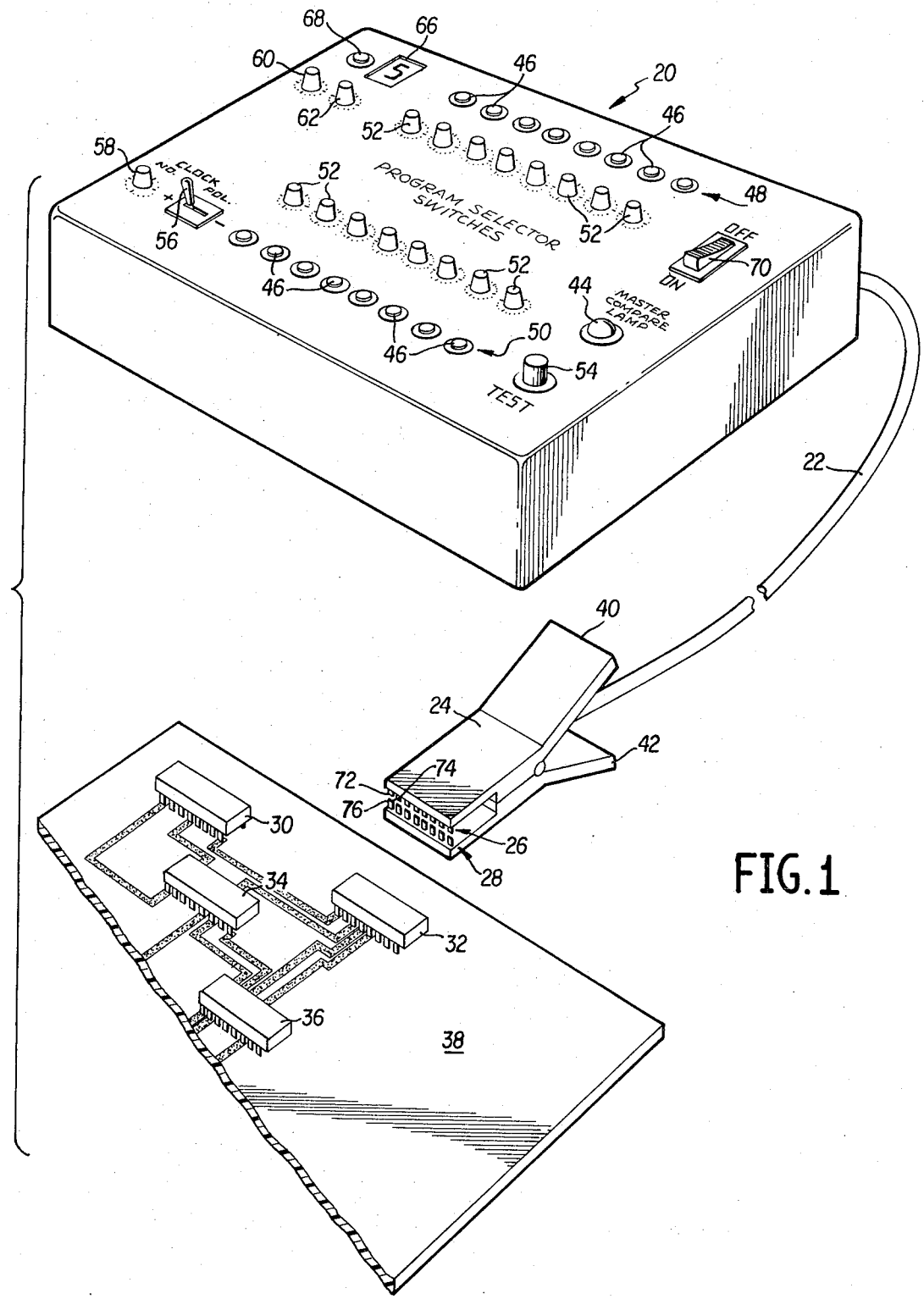
FIG. 1 is a pictorial drawing of the IC in-circuit analyzer of the present invention showing also a portion of a printed circuit board having several integrated circuit units with dual in-line terminals located on the circuit board.

Referring now to the drawings, the apparatus of the present invention consists of a housing 20 which contains a suitable power supply, which may be either a transformer powered with commercially available A. C. power, or a battery, and the electronics described below. Attached to the housing is a cable 22 which may terminate in a sixteen-pin, clip-on connector member 24 containing two rows 26 and 28 of eight pins each. The pins in rows 26 and 28 are adapted to engage the terminal pins on integrated circuit devices 30, 32, 34, and 36, which are shown in FIG. 1 as being mounted on one side of a printed circuit board 38. Connector member 24 has two handle portions 40 and 42 which open the jaws containing pin rows 26 and 28 to allow these pins to engage the corresponding pin terminals on the IC devices which are in fourteen- or sixteen-pin, dual, in-line packages. All sixteen pins of the IC device can be simultaneously engaged by the sixteen pins on the connector 24, and, in the case of fourteen pin IC devices, two end pins, one each in row 26 and in 28, are ignored. In the event other housing shapes for the circuit components are employed, a corresponding change may be made in the connector member 24, it being necessary only that each of the terminals for each active circuit in a component housing to be engaged simultaneously on an individual basis so that each individual circuit contained within the housing can be exercised through representative modes of operation.

With the apparatus of the present invention, the connector 24 is placed on the IC device 30 while the IC device remains electrically connected in place on the circuit board 38. For use as a trouble-shooting aid with respect to a circuit board 38, the board 38 will have been previously installed and used in operating equipment. If the circuit board 38 has been found to be defective and has been removed for determination of the fault on the board, the various IC devices on the circuit board may be tested in seriatim by the present invention.

The present invention contemplates exercising each of the IC devices without requiring additional electrical connections to the circuit board in most instances, excepting for that supplied through connector member 24. However, if the circuit board is located so that the connector member can be applied to the various devices while it is installed, the test apparatus as described may be programmed to detect the voltages on the various terminals of the component under test, and at the same time, add test signals if desired.

After IC device 30 has been functionally tested, on indication appears, either at the master compare lamp 44 or at a particular one of the fault lamps 46 which are in two rows 48 and 50 of eight lamps each and correspond to the pins in rows 26 and 28 of connector 24.

Associated with each terminal pin of the IC device under test and its corresponding fault lamp 46 is a separate means for applying a predetermined voltage to the particular pin. In the embodiment illustrated in FIG. 1, this is accomplished by a program selector switch 52 which may be operated either manually or through software. In either event, the settings of the 16 program switches 52 are usually different for each different IC device 30, 32, 34, 36 to be tested. In many cases, switches 52 must be changed two or more times and separate tests conducted to fully exercise a single IC device, as will be explained below.

The actual settings of switches 52 are determined by analyzing the IC device in its logic circuit on the circuit board 38. On IC device terminal pins which serve as input terminals, the program switches 52 are adjusted to provide the normal level or signal voltages, as will be described below. For output terminals of the IC device, no voltage is applied, but instead the generated voltage is fed back into test apparatus 20 where it is compared with the predicted voltages. In the case of total comparison, master compare lamp 44 is illuminated. In the case any one or more pins on the IC device under test do not have the predicted voltage, a fault lamp 46 associated with the particular pin where the predicted voltage was not received will be illiminated and the master compare lamp 44 will remain dark.

Assuming that IC device 30 has been tested and been found to operate satisfactorily, connector member 24 is then moved by the operator to IC device 32. The program switches 52 are then set to apply the appropriate level and signal voltages to IC device 32. Each test is initiated by actuation of a momentary test switch 52 which is depressed by the operator. The total period of the test from an electronic standpoint is less than a second.

After IC device 32 has been tested, connector member 24 may then be moved to IC device 34, the program switches 52 adjusted, and test button 54 depressed. If the master compare lamp 44 shows a satisfactory test, the connector 24 may be moved to IC device 36.

Some IC devices are connected in such a way that more than one test is required in order to fully exercise the IC device through all its modes of operation. Therefore, on some occasions it will be necessary to reset program switches 52 after a first test and then depress test button 54 again in order to run a second test, or a third test. On some occasions, it may be necessary to run up to nine sequential tests before a particular IC device is totally tested.

As will be evident from the foregoing, each of the IC devices on a printed circuit board can be tested individually in seriatim without removing the IC device from the printed circuit board 38. Only when a fault is found with an IC device is it necessary to unsolder the defective IC device from the circuit board and make a replacement. All of the testing may be accomplished either with the circuit board in the operating system or with the circuit board removed and powered by the circuit of the instrument housing 20 through the connector member 24.

Additional controls on the face of the illustrated test instrument housing 20 include a clock polarity switch 56 and a clock pulse number selector switch 58 which can be set to determine how many clock pulses will be supplied in the case of testing a counter circuit. Two switches 60 and 62 are provided to allow the operator to detect a predicted number of transitions that should occur as, for example, in the case a terminal is an output pin for a counter circuit. Thus, switch 60 may be set to select which of the sixteen pins will be tested for transitions; switch 62 is set, in conjunction with the setting of switch 58 to predict the number of transitions on the terminal pin selected by switch 60 which should occur during the test. A numeral display device 66 may be provided, if desired, to display the actual number of transitions detected. A fault lamp 68 is provided in the event the number of transitions detected does not correspond with the number of transitions that had been programmed by the operator.

An On-Off switch 70 is provided to disconnect the main power from the unit.

Figure 2:
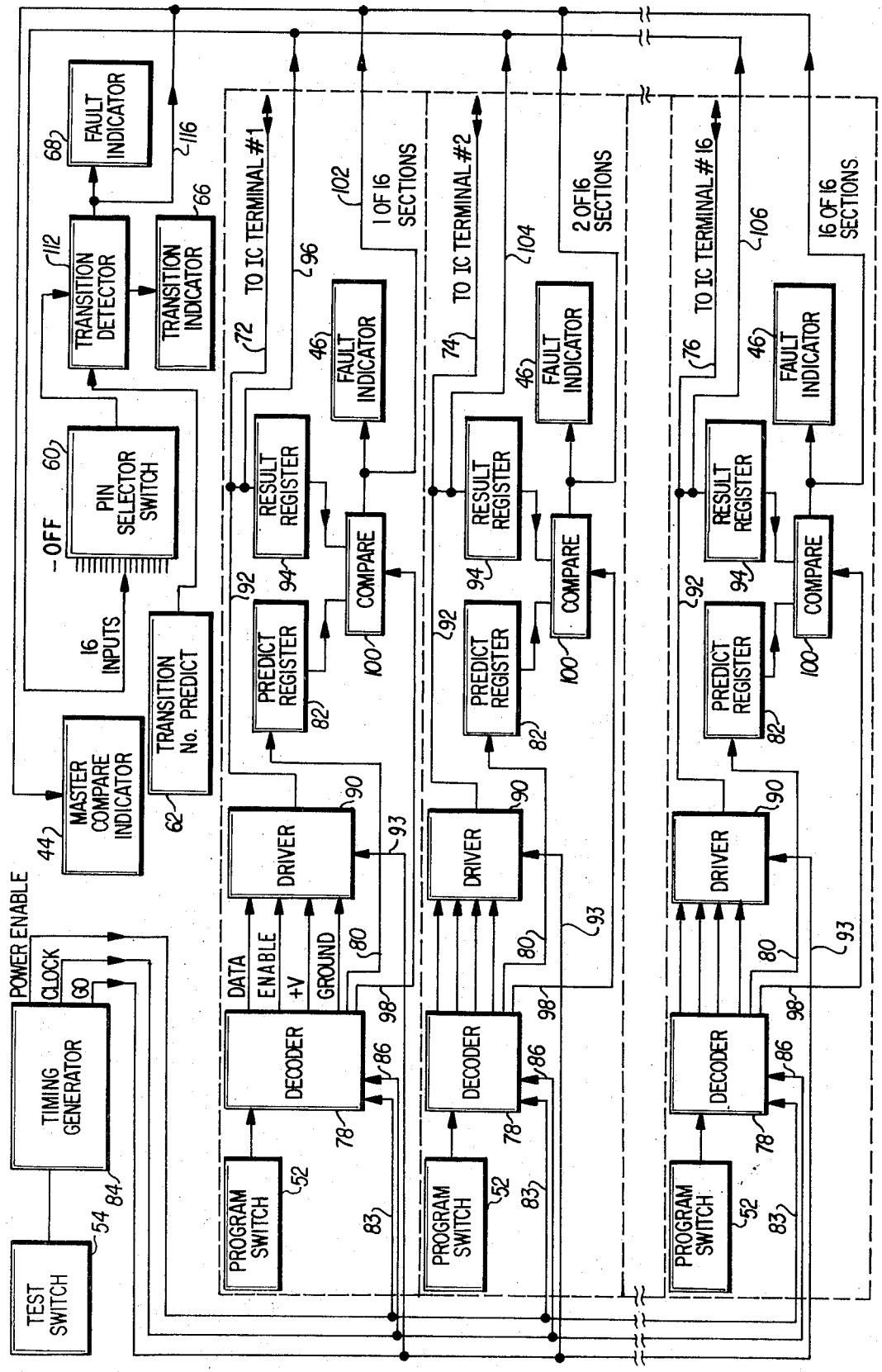
FIG. 2 is a block diagram of the IC in-circuit analyzer of the present invention.

Referring now to FIG. 2, there is illustrated a block diagram of the system in accordance with the present invention wherein three of sixteen identical sections are shown in dotted lines. Each section contains its own separate program switch 52 and its own output lead 72, 74, 76 which connects with a corresponding terminal No. 1, No. 2, No. 16, respectively, on the IC device through connector member 24. In section 1 of FIG. 2, the output lead 72 is also labeled in FIG. 1. Section 2 has an output lead 74 and section 16 has an output lead 76. The remaining sections 3 through 15, not shown in FIG. 2, are identical to the three sections that are shown.

Each section contains a decoder stage 78 which produces control signals for the driver stage 90. These signals are identified as DATA, ENABLE DRIVER, +V and GROUND. The decoder state 78 may also produce a signal on lead 80 which is stored in the predict register 82 and a signal on lead 98 which can inhibit the operation of the compare circuit 100.

Input signals to decoder stage 78 include a POWER ENABLE signal on lead 83 from timing generator 84 and a CLOCK signal on lead 86, also from timing generator 84.

Decoder stage 78 is so controlled by the setting of a multiposition program switch 52 (see also FIG. 1), when the test switch 54 is actuated and the timing generator 84 produces its output signals, that one of several possible signal conditions occurs. This signal condition determines the output signal on lead 92 from the driver stage 90.

With continued reference to FIG. 2, the output signal from the driver stage 90 appears on lead 92 and is applied to terminal 72 of the first section, and also to result register 94. The same signal is, additionally, applied to lead 96 which is applied as one of sixteen inputs to pin selector switch 60. The signal does not pass the pin selector switch 60 unless the particular pin involved is programmed to be used in a transition detection function, as will be described below. In that event, an inhibit signal is present on lead 98 from decoder 78 and is used to inhibit the operation of the compare circuit 100.

In normal operation, the signal in the predict register 82 is compared with the signal in the result register 94 by compare circuit 100. If there is a proper comparison, an appropriate voltage level is applied on lead 102 to master compare indicator 44. If there is a non-comparison, the signal voltage on lead 102 prevents the master compare indicator from turning on, and instad actuates fault indicator 46 in connection with section 1.

Section 2 has its own separate lead 104 which is connected to an input of pin selector switch 60. Each of the other sections, including section 16, has individual leads, such as 106, for connection to pin selector switch 60. Each section 2 through 16 also has its own compare circuit 100 and fault indicator, as illustrated also in FIG. 1.

DRIVER STAGE

Figure 3:
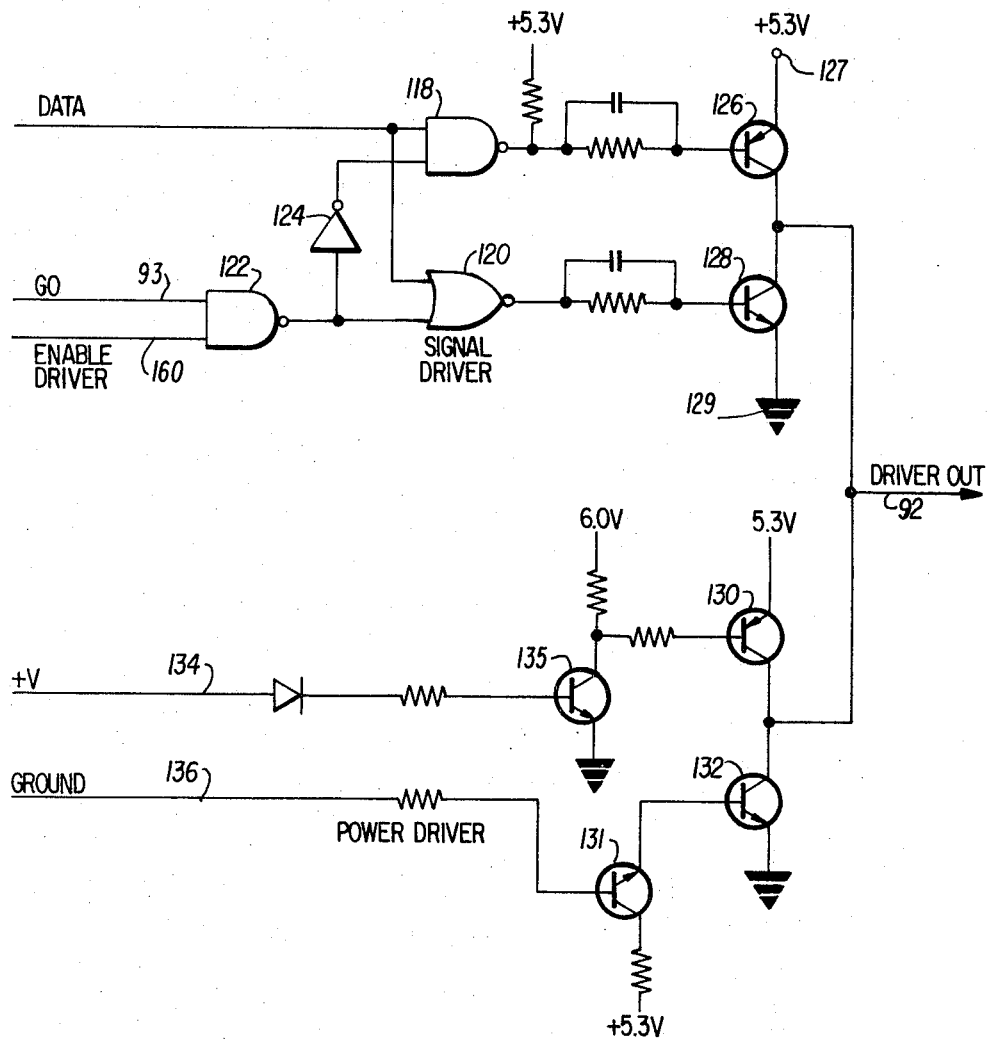
FIG. 3 is a circuit diagram of the driver stage.

Referring now to FIG. 3, the driver stage 90, as shown in FIG. 2, is here illustrated in greater detail, and comprises two sections, the signal driver and the power driver. As is apparent from FIG. 2, the driver stage obtains four signals from the output of decoder 78. The DATA signal is applied as one input to NAND circuit 118 and also to NOR circuit 120. The ENABLE DRIVER signal from decoder 78 is applied to NAND gate 122 along with the GO signal on lead 93 from timing generator 84. The output signal from NAND gate 122 is applied to NOR gate 120 and through inverter 124 to the other input of NAND gate 118. The output signals from gates 118 and 120 drive a pair of transistors 126 and 128 which constitute the signal driver. Transistor 126, which may be a 2N6067, should be capable of sourcing at least 400 MA at 5 volts and transistor 128, which may be a 2N5845, should be capable of sinking 400 MA at no more than 0.4 volts. The rise and fall times of both transistor 126 or 128 should be less than about 50 nanoseconds.

NAND gate 118, which has low-true output, applies a low voltage to the base causing transistor 126 to conduct heavily and thus apply to output lead 92 a high logic level voltage. Under these conditions, transistor 128 is non-conducting.

When NOR gate 120 applies a high voltage to the base of transistor 128, it conducts heavily while transistor 126 is non-conducting, to thereby provide a low logic level output signal on lead 92.

At all other times, both transistors 126 and 128 are biased in an OFF condition, which means that lead 92 is then electrically disconnected from the power supply represented by the +5.3V at terminal 127 and terminal 129 that are connected across transistors 126 and 128 of the signal driver. When either transistor is made conductive, the other transistor is cut off.

The power driver also contains two transistors 130 and 132, which are similar to transistors 126 and 128 and which have a common junction connected to lead 92. If both transistors are biased to an OFF condition, lead 92 is electrically disconnected from the power supply terminals connected to transistors 130 and 132.

If the decoder is programmed to cause a +V to be applied to the IC device terminal connected to the corresponding lead 92, a high level voltage is present on lead 134 thereby causing transistor 135 to conduct and produce a low level on the base of transistor 130 which in turn causes it to conduct heavily and thereby source the positive voltage to output terminal 92.

On the other hand, if it is desired that the output terminal 92 of the driver be provided with a ground signal (which is nominally a fraction of a volt), a high level voltage signal is applied on lead 136 which thereby causes transistor 131 to conduct and transistor 132 to saturate and act as a sink holding the output terminal 92 to within a fraction of a volt of ground potential.

DECODER

Figure 4:
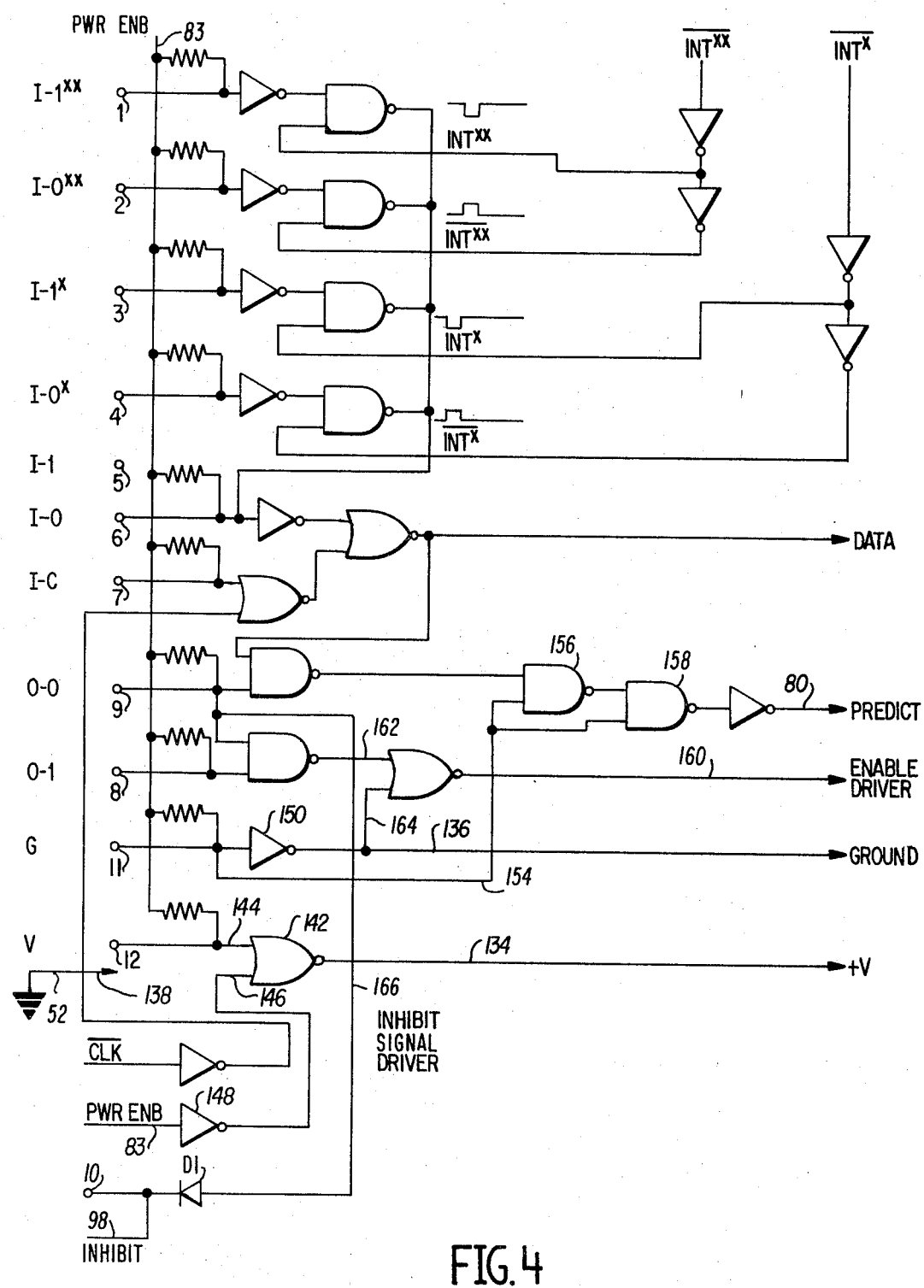
FIG. 4 is a circuit diagram of the decoder.

Turning now to FIG. 4, a schematic diagram of the decoder is illustrated which has five output signals shown near the middle of the right-hand side of the figure. The upper output signal lead is identified as DATA and is connected to the driver of FIG. 3 as described above. Terminal 80 carries the PREDICT signal which is supplied to the predict register 82, as shown in FIG. 2. Other output signals include ENABLE DRIVER, GROUND and +V, all of which are applied as input signals to the driver circuit of FIG. 3.

The decoder of FIG. 4 consists of a group of inverters, NAND, and NOR gates which are connected as illustrated and all of which function in a conventional manner, and thus will be only briefly described.

At the left-hand side of FIG. 4, there are a series of switch terminals labeled 1 through 12 which are all connected to one or more logic circuit elements (with the exception of terminal 50), and are part of the program selector switch 52 associated with each terminal of the IC device to be tested, as illustrated also in FIG. 1.

Program switch 52 is shown in FIG. 4 with contact terminals 1 through 12 and a moving wiper contact 138 which is connected to ground. In the illustrated embodiment, all of the contacts 1 through 12 remain open, excepting for the one selected position which is connected to ground. Program switch 52 may be any suitable switch which provides this switching function and thus may be a mechanical rotary switch, or the switching function may be performed electronically. In FIG. 4, switch 52 with contact arm 138 is shown on the left-hand side of the drawing just below switch contact 12 for purposes of discussion.

Each of switch contacts 1 through 4, 6 through 9, 11 and 12 is connected to the POWER ENABLE line 83 (which is a +V during the test cycle) through its respective voltage drop resistor so that the input to the associated logic terminal will normally be at +V. The particular contact that is engaged by the movable switch contact 138 of program switch 52 is connected to ground, and the associated logic element then has its input voltage changed from the positive level to the ground level.

Contact 12 is connected to NOR gate 142 which has lead 144 connected to the positive voltage on POWER ENABLE lead 83. Lead 146 is connected to the output of inverter 148. The input signal to inverter 148 is also the positive going, POWER ENABLE pulse (see FIG. 5) on lead 83 from timing generator 84, as shown in FIG. 2.

Figure 5:
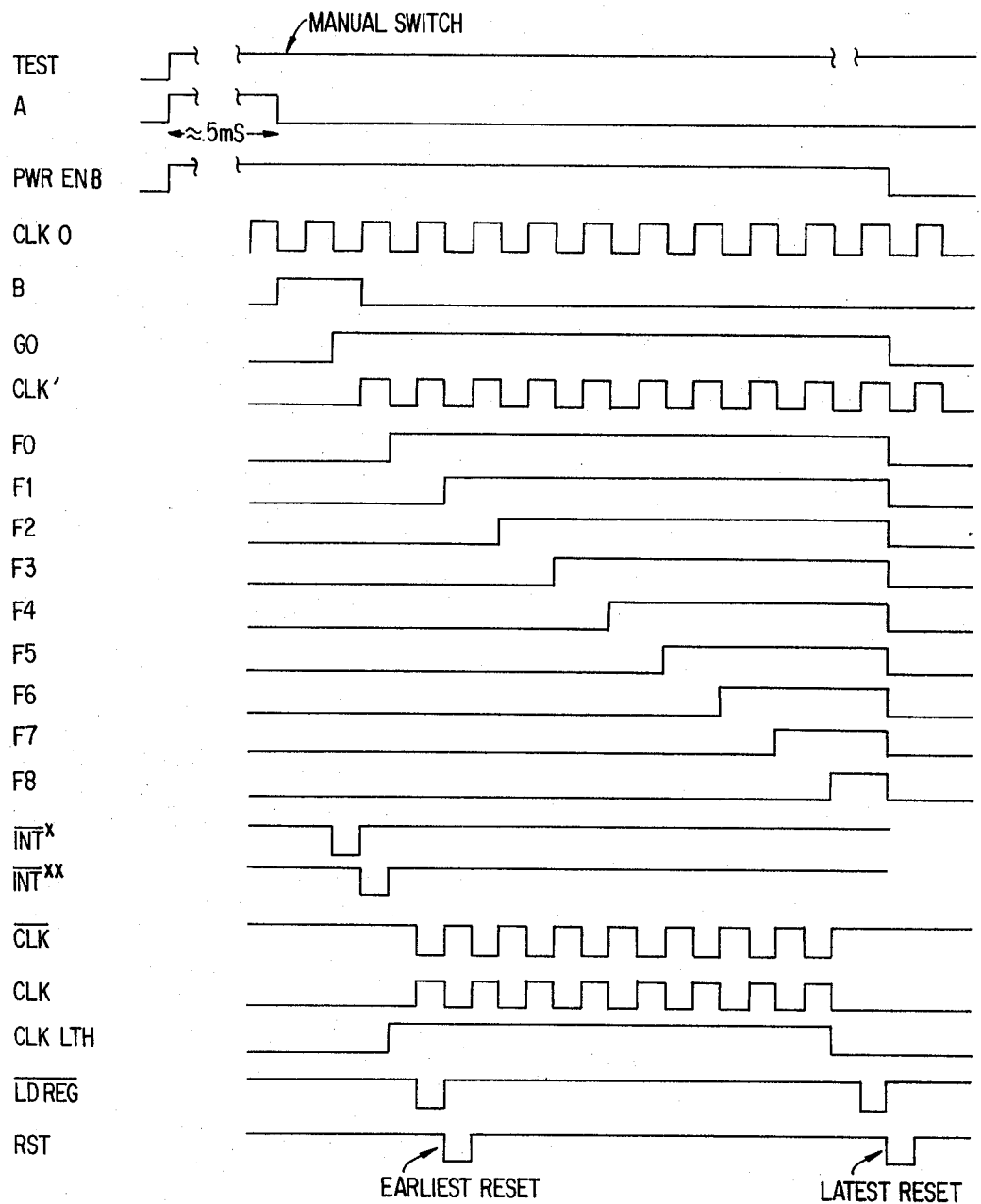
FIG. 5 is a timing diagram.

NOR gate 142 has a low output voltage, excepting when both inputs on leads 144 and 146 are low. A high output signal on lead 134 indicates a +V voltage is to be provided by the driver 130 of FIG. 3 on its output terminal 92. Thus, when switch contact 158 of program selector switch 32 engages contact 12, and when the POWER ENABLE signal is present on lead 83, a positive going signal is present on lead 148 for the duration of the POWER ENABLE pulse, as shown in FIG. 5, which in turn provides the desired positive going signal on lead 92 connected to the output of driver stage 90 of FIG. 2. This then applies the +V level voltage to the particular terminal on the IC device for the duration of the POWER ENABLE signal on lead 83.

When program selector switch 52 is moved to contact the No. 11 terminal, ground is applied to inverter 150 which produces a positive level GROUND signal on lead 136, which is an input lead to the power driver of FIG. 3.

The normally positive potential on lead 154 which is supplied to NAND gates 156 and 158 usually provides a positive level on lead 80 which serves as the PREDICT signal that is supplied to the predict register 82 (see FIG. 2). When lead 54 is grounded, the PREDICT signal on lead 80 assumes a ground level.

In the absence of a malfunction of the IC under test, the PREDICT voltage level on lead 154 will match either the +V or the GROUND levels supplied by the power driver transistors 130 and 132.

When program selector switch 52 is in contact with the No. 10 terminal at the bottom of FIG. 4, which corresponds to the inhibit function, a ground level voltage is applied to lead 98 which is also applied to compare circuit 100 of FIG. 2. This disables the compare circuit and thereby prevents any output signal from being generated which would either cause the associated fault indicator 46 to illuminate or prevent the operation of the master compare indicator 44, as shown in FIG. 2.

The ENABLE DRIVER signal on lead 160 is kept at a low level to thereby disable the signal driver portion of the driver stage of FIG. 3 for those terminals which are to have a level voltage as distinguished from a signal voltage, which is of much shorter duration. As is evident from the timing diagram of FIG. 5, the POWER ENABLE positive going voltage level occurs quickly after the test switch 54 is depressed. This allows a positive level voltage to be supplied to the driver output lead 92 (see FIG. 3) immediately upon depression of test switch 54. If a ground level is desired on driver output lead 92, it becomes available on lead 136 upon the setting of selector switch contact 138 to terminal 11. On the other hand, the signal driver portion of the driver stage of FIG. 3 cannot become enabled unless the positive going GO signal is present on lead 92. As is evident from the timing diagram of FIG. 5, the GO signal does not start until after certain events, to be described below, have taken place.

The signal driver portion of the driver stage of FIG. 3, before it can become operative, must have also the ENABLE DRIVER signal on lead 160. This signal is derived in the decoder circuit of FIG. 4 on lead 160 which is connected to the output of a NOR circuit having input signals on leads 162 and 164. For the ENABLE DRIVER signal to be positive, it is essential that both of the signals on leads 162 and 164 are simultaneously zero. The level on lead 164 will normally be zero except when switch contact 138 engages switch terminal 11. The voltage level on lead 162 will be zero except when switch contact 138 is on terminal 10 to thereby provide the inhibit power driver signal on lead 166 or the switch contact 138 is on either of terminals 8 or 9.

The selector switch contact 138 is moved to the inhibit terminal 10 when, for example, it is desired to detect the number of transitions that an output terminal of the IC under test experiences during the test, and it is unimportant whether the voltage on the output terminates in a positive or zero condition.

Selector switch contact 138 is moved to terminals 8 or 9 in situations where the terminal on the IC under test is an output terminal and it is important to determine that the level on the output terminal should be either a 1 (terminal 8) or a 0 (terminal 9).

Positions 5, 6, and 7 of the selector switch contact 138 are used when input signal voltages are provided on the respective terminal of the IC under test. Terminal 5 provides a logical 1; terminal 6 provides a logical 0; and terminal 7 provides one or more pulses as determined by the setting of switch 58 (see FIG. 1) at the frequency of the clock contained within the test equipment.

Turning now to FIG. 5, the diagram, fourth from the bottom, labeled CLK, illustrates eight clock pulses which correspond with the maximum number of pulses the illustrated embodiment is adapted to generate. This is sufficient to test the functional operation of up and down counters though two or more tests may be required before all functions of the counter are fully tested. The number of clock pulses that are to be employed in a test is set by the operator through switch 58 (see FIG. 1). Unless a switch contact 138 is set on terminal 7, switch 58 has no influence on the operation of the test equipment.

Referring again to FIG. 4, with the switch contact 138 set on terminal 5, the decoder circuit as illustrated operates in accordance with its wired configuration. In this event, the DATA signal is a positive level which causes the driver circuit of FIG. 3 to produce a positive signal on lead 92 of the driver output signal for the duration of the GO signal on lead 92.

If it is desired that the DATA signal be a logical zero, the selector switch is set at terminal 6.

If it is desired to apply clock signals as the DATA signal, switch contact 138 is set at position 7, and the desired number of clock pulses is then entered by means of setting switch 58 (see FIG. 1).

In testing various circuits, it is frequently necessary to be sure that when the IC under test is first powered up, it assumes a known condition before beginning the test of the logic circuit. The apparatus of the present invention accordingly provides for the generation of pulses at two preliminary periods ahead of the normal test cycle. For example, in the case of an IC containing a counter, the earliest of the two preliminary periods can be used to generate a clear counter signal and the second of the preliminary periods used to load the counter to a predetermined count. Thereafter, a predetermined number of pulses can be added or subtracted from the number loaded into the counter to thus check the operation of the counter, including carry and borrow functions.

With reference to FIG. 4, the switch contacts numbered 1 through 4 are used to provide a signal pulse, either a logical 1 or a 0, during one of the two preliminary periods. The input signals at the upper righthand corner of FIG. 4 $INT^X$ and $\overline{INT^{XX}}$ occur ahead of the clock signals as illustrated in the timing diagram of FIG. 5. In each case, the signal occurs only for the duration of a clock pulse and the output signal from the decoder appears as a DATA signal.

TIMING CIRCUIT

Figure 6:
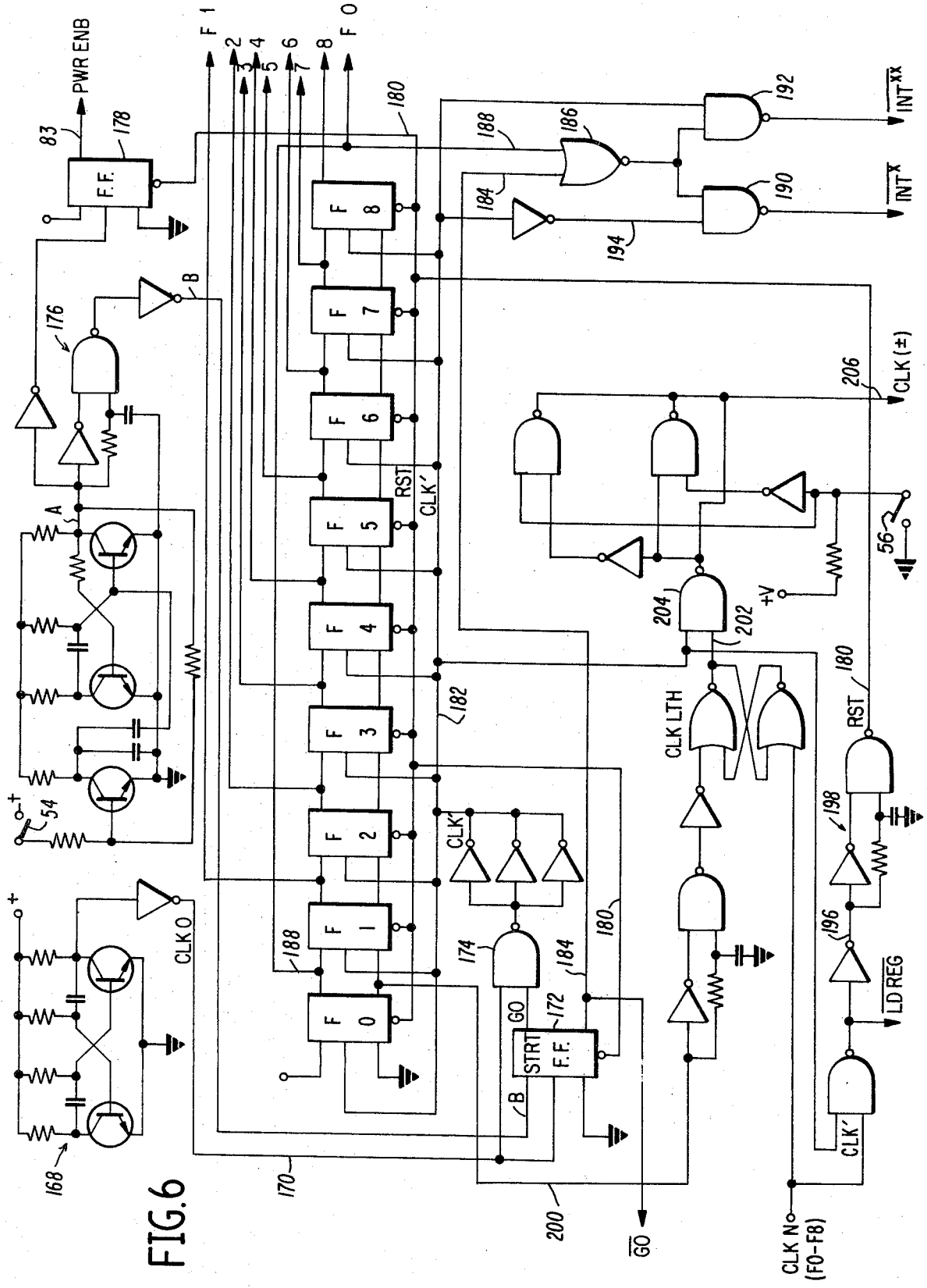
FIG. 6 is a schematic diagram of the timing generator.

Referring now to FIG. 6, the clock oscillator and related timing circuits are illustrated which are capable of producing the timing signals as shown in FIG. 5. At the upper left-hand corner of FIG. 6 is a free-running clock oscillator 168 of any conventional construction. The frequency of the oscillator in the illustrated embodiment is approximately 2 MHz. The output signal CLK 0 is applied on lead 170 to start flip-flop circuit 172 and to NAND circuit 174. In order to set start flip-flop 172, it is necessary also to have the B signal which is derived from a one-shot delay circuit 176. The delay circuit 176 is actuated by a timing signal A which appears at the output of a one-shot multivibrator circuit having a delay of approximately 0.5 milliseconds. This circuit is actuated by the closure of test switch 54 (see also FIG. 1).

As is evident from FIG. 5, closure of test switch 54, which is the manual switch referred to in FIG. 1, produces the timing signal A having a duration on the order of 0.5 milliseconds. This signal is applied to flip-flop 178 to thus produce the POWER ENABLE signal. The flip-flop 178 is reset by the RST signal on lead 180 which occurs at the end of the test cycle.

Signal A triggers one-shot delay circuit 176 which produces an output signal B that is also applied to the start flip-flop circuit 172.

Start flip-flop circuit 172 is triggered by the first negative going CLK O edge after the positive going B signal is present. Output signals from the start flip-flop are labeled GO and $\overline{GO}$. Start flip-flop 172 is reset by the RST signal on lead 180. The positive going GO signal is applied to NAND gate 174 along with the CLK O signal from clock oscillator 168 so that when both signals are positive, the CLK' signal is generated on lead 182.

Before the first CLK' signal is generated, the $\overline{GO}$ signal on lead 184 is applied to NOR gate 186. The lead 188 is connected to the output of flip-flop FO which, at this point, is at a low level. As a result, both of NAND gates 190 and 192 are enabled by the output from NOR gate 186. Since the CLK' on lead 182 has not yet appeared, a positive signal is present on lead 194 to thereby provide the $\overline{INT^x}$ output from NAND gate 190. The appearance of the first CLK' signal on lead 182 turns off NAND gate 190 and turns on NAND gate 192 to thus produce the $\overline{INT^{xx}}$ signal.

The first CLK' pulse on lead 182 triggers flip-flop FO thereby providing a high level on lead 188 and also at the output terminal FO to thus disable NAND gates 190 and 192 for the balance of the test cycle.

Consecutive CLK' pulses on lead 182 sequentially advance the flip-flops F1 through F8 to produce output signals as illustrated in FIG. 5.

The appearance of a reset signal RST on lead 180 stops the entire operation by resetting start flip-flop 172. The RST signal on lead 180 can appear sufficiently early to prevent flip-flop F1 from being set. If the particular IC circuit being tested does not have any terminal which requires the decoder switch to be set on a clock position, the FO signal is used as the ClK N shown at the left-hand side of FIG. 6 for producing the load register, or, as illustrated, the $\overline{LD\ REG}$ signal. The trailing edge of the $\overline{LD\ REG}$ signal on lead 196 is used to trigger one-shot circuit 198 which produces the reset signal RST on lead 180.

In the event any one of the program selector switches 52 is set to a position 7 (see FIG. 4) and clock number switch 58 is set to a number of clocks greater than 0, a clock latch (CLK LTH) is set by a $\overline{FO}$ signal on lead 200. The output signal 202 from the CLK LTH circuit is applied to NAND gate 204 which receives the CLK' signal to thus produce on lead 206 either positive or negative clock pulses depending on the setting of polarity switch 56 (see also FIG. 1). As soon as the CLK N signal appears, it causes the CLK LTH to unlatch and no more clock pulses pass thruogh NAND gate 204.

With reference to FIG. 5, it is thus apparent that the CLK LTH circuit is disabled by the setting of flip-flop F8, the assumption in the timing diagram being that the clock number selector switch 58 has been set at 8. The $\overline{LD\ REG}$ signal has a leading negative going edge which occurs at the time of the first positive going edge of the CLK' signal after the CLK N signal is received. The reset signal RST on lead 180 starts on the trailing edge of the $\overline{LD\ REG}$ signal.

The latest that the reset signal can occur in the illustrated embodiment is after the setting of flip-flop F8. The earliest the reset signal can occur is at the trailing edge of the $\overline{LD\ REG}$ which is initiated by the first CLK' signal following the positive going FO signal received at the terminal marked CLK N.

As is evident from the timing diagram of FIG. 5, the leading edge of the reset signal determines the time when the PWR ENB signal and the GO signal are discontinued. As is evident from FIG. 3, termination of the GO signal terminates operation of the signal driver portion of the driver stage. As is evident from FIG. 4, termination of the PWR ENB signal terminates the application of all voltages to the circuit component under test.

Assuming that the clock operates at a frequency of 2 M Hz each clock cycle required $0.5\mu$ seconds. The test period as represented by the duration of the GO signal varies between $1\mu$ seconds and $5\mu$ seconds for the illustrated embodiment.

While satisfactory results have been achieved with the clock pulse oscillator 158 of FIG. 6 operating at a frequency of approximately 2 MHz, it is apparent that the time of the test when operating voltages are applied to the IC can be reduced by increasing the frequency of oscillator 158. The upper limit of the oscillator frequency is obviously determined by the period of response of the IC under test.

It has been surprising to find that the time required for a test cycle which exercises the IC component is sufficiently small to prevent damage to other ICs on the circuit board which are not under test but which nonetheless are exposed to the voltage levels applied to the terminals of the IC under test.

One of the basic problems encountered when attempting to functionally test a TTL or DTL digital IC in-circuit is to provide sufficient voltage and current to exercise the IC under test and yet not supply enough energy to cause damage to the other logic elements or sub-systems connected via the circuit board to the terminals of the IC under test. We have found that by applying steady state logic levels to the inputs of an IC under test and observing the output, damage occurs in companion IC units mounted in the same circuit board.

An important concept of the present invention thus involves applying all input voltages to the IC under test where those voltages may cause damage to the companion IC units or other sub-systems on the printed circuit board, for a brief test interval of time typically less than about 10μ seconds. It is, however, not always possible to stabilize the circuits with the application of test voltages for such a brief period of time. Therefore, certain voltage levels which can be safely applied over a longer period of time, such as 0.5 milliseconds, are first applied to allow the circuit to reach a stable condition and thereafter the signal voltages are applied for an interval of time, typically from 1 to 3μ seconds. Even though the power supply must have sufficient capacity to force each terminal to predetermined levels regardless of the influence on these terminals from other circuits on the printed circuit board which in some cases is powered-up by reason of the power supplied to the IC unit under test, this short test interval reduces the power consumption in companion IC units on the printed circuit board that are not under test sufficiently to prevent damage due to heat. The test voltages necessary for forcing the IC unit through a functional test may be kept sufficiently low to avoid damage due to excessive voltage.

With reference to FIG. 5, all of the necessary control signals and strobes are generated by the timing and control section of the generator of FIG. 6. The start flip-flop 172 (FIG. 6) provides the GO signal used to gate the driver stages of FIG. 3. The width of the GO signal is equal to the test time interval. The last signal generated is a reset pulse occurring after the load register (LD REG) has been provided. The LG REG signal is used to load and hold in the PREDICT and RESULT registers the voltage levels present at the end of the test interval.

As shown in FIG. 5, the reset pulse can occur as early, following the begining of the GO signal, as the EARLIEST RESET POSITION where clock pulses are not used during the test. If eight clock pulses are used during the test, the reset signal does not appear until the position indicated in FIG. 5 as LATEST RESET. If fewer than eight clock pulses are used during the test, the reset pulse will occur somewhere between the EARLIEST RESET and the LATEST RESET positions, as illustrated in FIG. 5. It should also be clear that there is only one LD REG signal which slightly precedes, and actually initiates, the reset pulse for each test cycle.

STORE AND COMPARE

Figure 7:
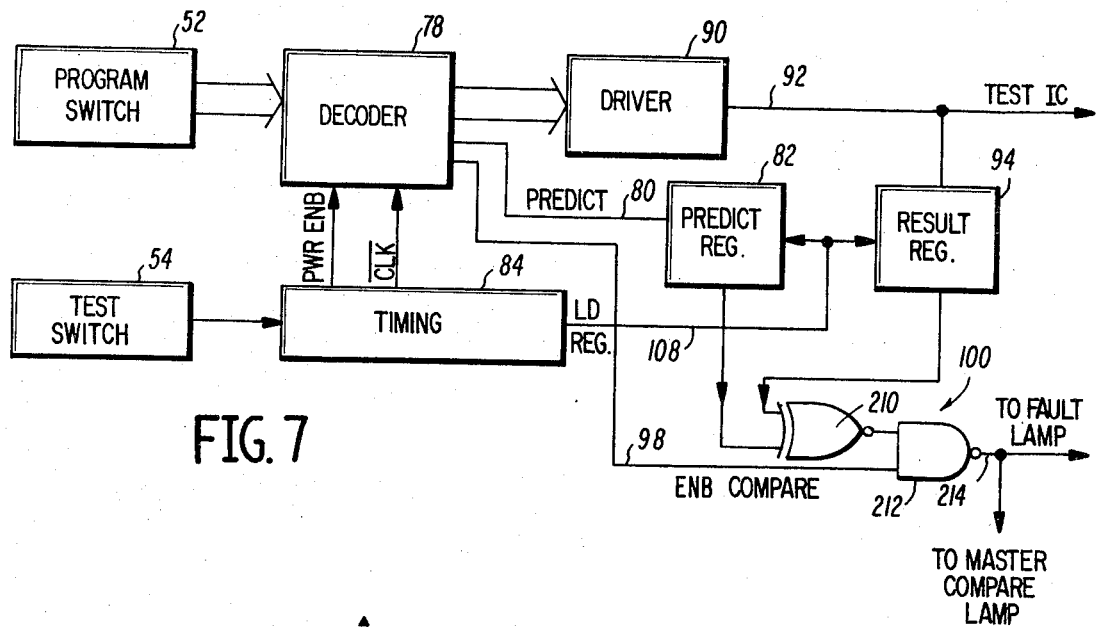
FIG. 7 is a schematic diagram of one section illustrating the compare circuit of the apparatus of the present invention.

Referring now to FIG. 7, a block diagram is shown which includes the program switch 52, decoder 78, and driver 90, all of which have been discussed above. The timing circuit 84, initiated by actuation of test switch 54, produces a LD REG signal on lead 108 which is applied to both predict register 82 and result register 94. The PREDICT signal on lead 80 is derived from the decoder in FIG. 4 and applied to the predict register which may comprise a conventional 16-bit storage register. Result register 94 may be of identical construction. It registers the logic level actually present at the corresponding pins of the IC under test at the time of occurrence of the LD REG signals and holds these levels on lead 108.

The outputs from the predict register 82 and result register 94 are compared in an EXCLUSIVE OR gate 210. The EXCLUSIVE OR gate provides a low level output when both inputs are identical and provides a high level output when the inputs are opposite.

The output from EXCLUSIVE OR circuit 210 is applied as one input to NAND gate 212. The other input to NAND gate 212 is ENB COMPARE on lead 98 which is a normally high level. This ensures that the output signal at lead 214 will be high unless there is a mismatch between the output of the predict register 82 and the result register 94. In that event, both inputs to NAND gate 212 will be high and the level on 214 will be low, which will thereby cause the fault lamp to become energized.

Figure 8:
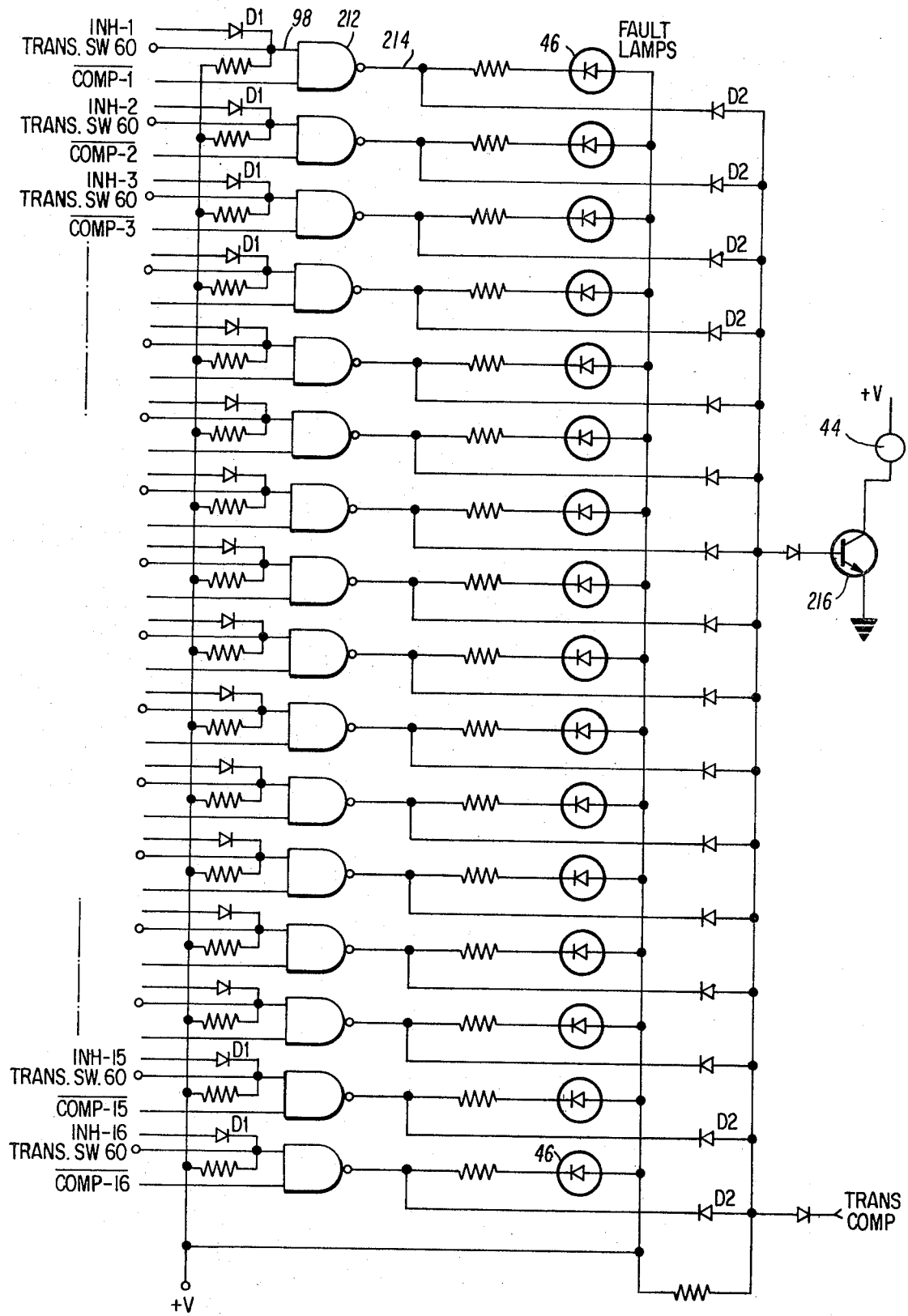
FIG. 8 is a schematic diagram of the fault lamp indicator circuit.

With reference now to FIG. 8, each of the sixteen fault lamps 46 (see also FIG. 1) are shown together with their associated circuitry. Each fault lamp may be an LED and have its positive terminal connected to the positive voltage of the power supply. The negative terminal of each fault lamp 46 is connected through a resistor to lead 214 which is the output of NAND gate 212.

The signal $\overline{COMP-1}$ refers to the normally low output signal from the EXCLUSIVE OR gate 210 of FIG. 7. The ENB COMPARE signal on lead 98 of FIG. 7 is present on lead 98 of FIG. 8. The signal on lead 98 is normally high except when the output of the compare circuit is to be ignored. Thus, when selector switch 52, as shown in FIG. 4, has its contact 138 connected to the No. 10 INHIBIT position, the level on lead 98 is low, thereby assuring that the output from NAND gate 212 will always remain high and thus prevent the associated fault lamp 46 from turning on.

Any time a particular terminal on the IC is supplied with clock pulses through the selection of that terminal by switch 60 (see FIG. 1) a low level signal is provided from switch 60 to lead 98 to thus assure that the output signal on lead 214 from NAND gate 212 remains high to thereby prevent turning on the associated fault lamp 46.

The output lead 214 from each NAND gate 212 is connected through diode D2 to a common buss which controls the operation of transistor 216 which is associated with the master compare lamp 44 (see FIG. 1). If any one of the diodes D2 is connected to the low potential, this biases transistor 216 so that the master compare lamp 44 does not turn on.

TRANSITION DETECTOR

Figure 9:
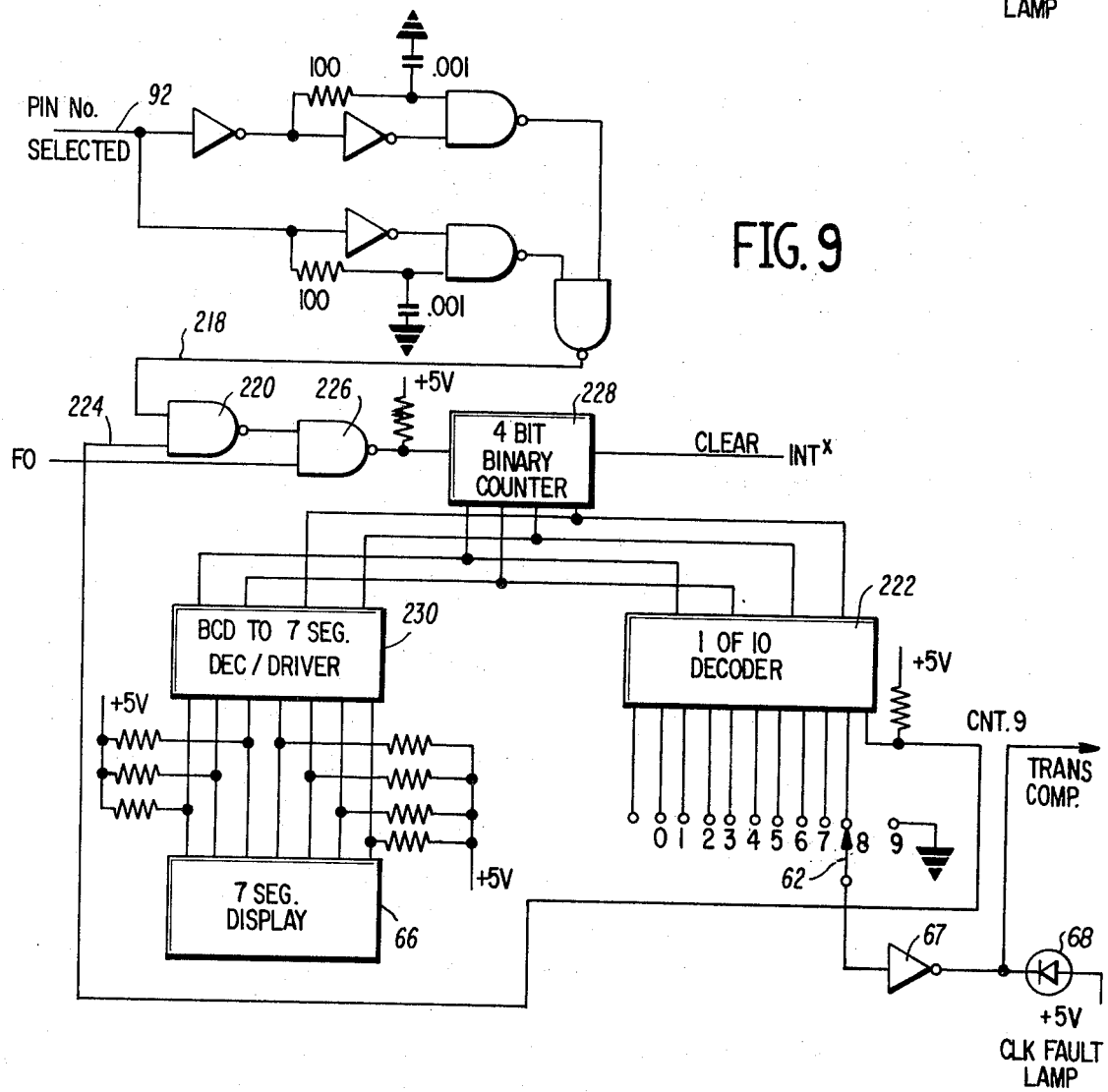
FIG. 9 is a schematic digram of the transition detector circuits.

Referring now to FIG. 9, the apparatus of the present invention desirably contains the ability to detect the number of voltage transitions which any one particular terminal on an IC package undergoes during the test cycle. For example, in a binary counter, it may be desirable to test whether a particular terminal, which may be the carry or borrow terminal, produces the necessary signal in response to a known condition of the circuit; also, various terminals in the counter can be predicted to undergo a certain number of transitions in response to a predetermined number of input clock pulses from the test equipment.

As discussed earlier in connection with FIG. 1, switch 60 is used to identify or select a particular terminal on the IC package to be tested for transitions. Switch 62 is set to a predicted number of transitions which is expected during the particular test.

In FIG. 9, the lead 92 is connected to the selected terminal of the IC package. The transitions are detected through a conventional circuit arrangement, as illustrated in FIG. 9, and are provided on lead 218 and applied as one input to NAND gate 220. The other input to NAND gate 220 is from the 1 of 10 decoder 222 which provides on lead 224 a blocking signal in event the capacity of decoder 22 has been exceeded. NAND gate 226 has as one input the FO gate (see also FIG. 5) which allows transitions to occur only during that portion of the test cycle which begins after the occurrence of the $INT^x$ $INT^{xx}$ signals shown on FIG. 5.

The output transition signals from NAND gate 226 are applied to a 4-bit binary counter 228 which, at the beginning of each test cycle, is cleared by a signal which occurs during the time interval $INT^x$.

The output of the binary counter 228 is applied to the decoder 222. If the decoder detects the proper number of transitions, the signal applied through switch 62 and inverter 67 will prevent fault lamp 68 from turning on. The output signal TRANS COMP is applied as an input signal at the lower right-hand corner of the circuit of FIG. 8 to thereby assure that if fault lamp 68 is turned on, the master compare lamp 44 will not turn on.

As a further optional feature, a numeral display device such as the 7 seg. display 66 (see also FIG. 1) may be connected to the output of a binary-to-decimal converter 230 which, in turn, is connected to the output of the binary counter 228. This feature provides a numerical display of the actual number of transitions which may be helpful in the event the operator has difficulty in setting PREDICT switch 62 to the appropriate number of transitions that occur.

METHOD OF TESTING A COUNTER

Figure 10:
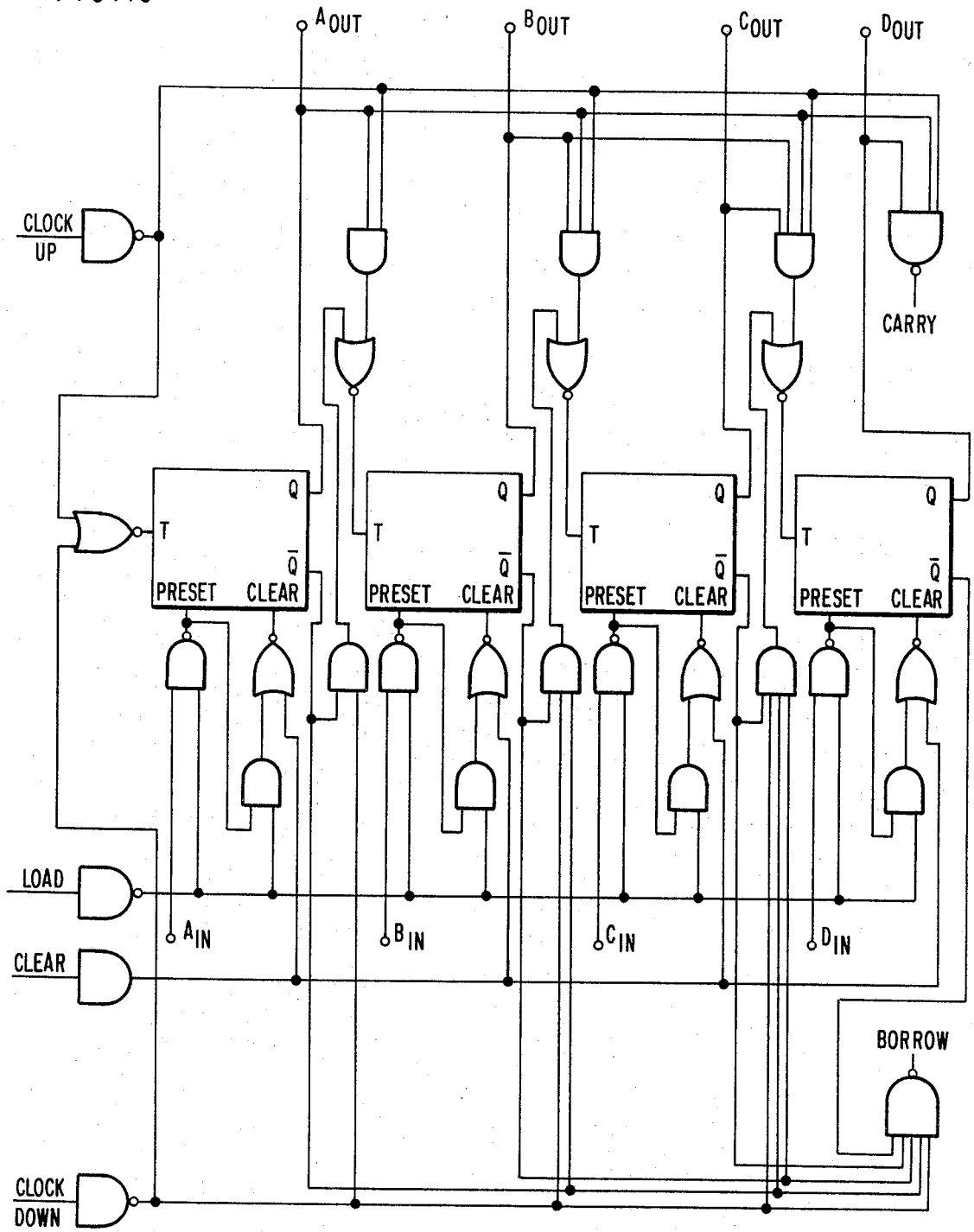
FIG. 10 is a logic diagram of an up/down binary counter which is conventionally available as an IC unit.

Referring now to FIG. 10, there is illustrated a binary counter which has four orders and is of a conventional type. The counter is representative of circuits that are available as integrated circuits in a package which contains 16 terminals, as illustrated also in FIG. 11.

The circuit of FIG. 10 has four input terminals on the lefthand side labeled CLOCK UP, LOAD, CLEAR, and CLOCK DOWN. On the right-hand side, two output terminals are labeled CARRY and BORROW. At the top of the figure, four output terminals labeled $A_{out}$, $B_{out}$, $C_{out}$, and $D_{out}$. Between the LOAD and CLEAR lines are input terminals labeled $A_{in}$, $B_{in}$, $C_{in}$, and $D_{in}$. The illustrated circuit is capable of being preset to any number from 0 through 15. An input signal on the LOAD terminal controls the entry of these numbers and sets all outputs to appropriate state. Counting is performed through two clock lines, one controlling the count in the up direction and the other in the down direction. Two outputs BORROW and CARRY are connected to the clock inputs of subsequent counters to provide for the counting to numbers greater than 15.

Figure 11:
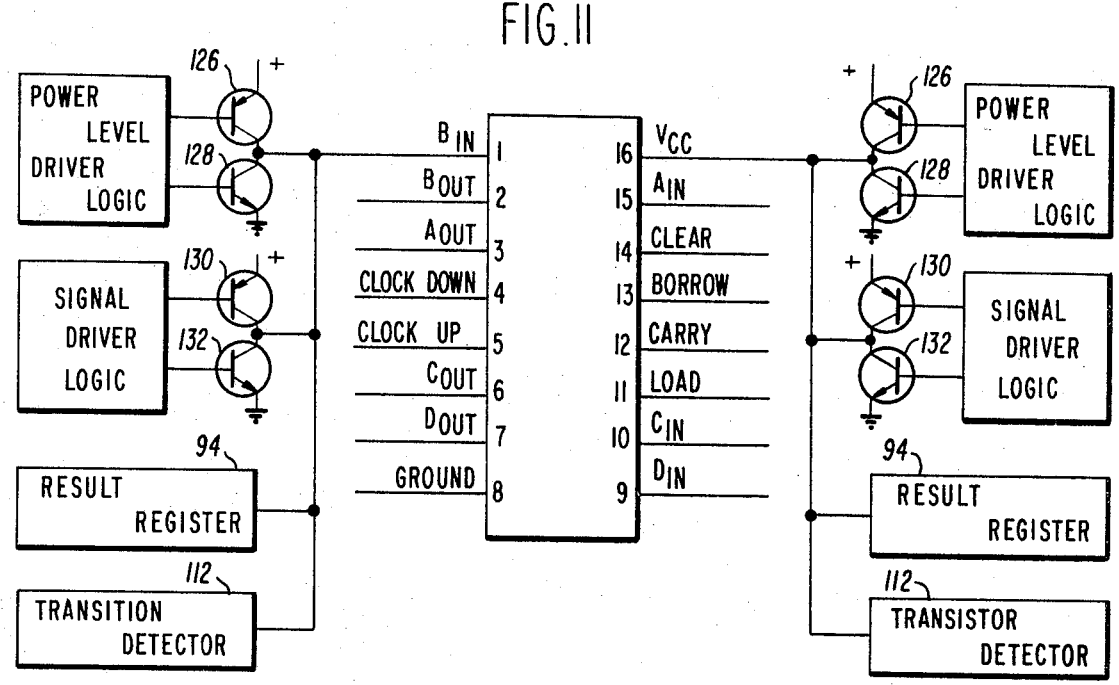
FIG. 11 is a diagram of the IC package of FIG. 10 illustrating the manner by which current driver stages of FIG. 3 are connected to the terminals of the IC package under test.

In FIG. 11, the test apparatus of the present invention is shown connected to terminals 1 and 16. It shuld be understood that the connector member actually engages all sixteen of the pins on the IC device simultaneously and it is only for ease of illustration that similar connections are not illustrated in FIG. 11 to the remaining terminals 2 through 15 of the IC package. The connections as illustrated in FIG. 11 are also evident from FIG. 2. In summary, the power level driver and the signal driver, as illustrated in FIG. 3, are connected to each terminal. Depending on the setting of the decoder in FIG. 4, one or the other of these drivers is actuated for those lines which engage an input terminal for the IC under test. If the IC terminal is an output terminal, then neither driver stage is energized, and the output signal from the IC device is either detected in the result register or the transition detector, both of which have been described above.

It is thus apparent that after the connector member has been placed on the IC package to be tested, the decoder set to make the appropriate functional tests, and the start button pressed by the operator, the operating power voltages are first applied through those pins which are adapted to receive ground and positive voltage. Thereafter, signal voltages are applied to the appropriate input terminals of the IC package, and at the end of the test cycle, the voltages present on the output terminals of the IC device are compared with an expected signal, either in the transition detector or in the result register. For example, in detecting transitions, it may not be necessary to know whether the final voltage on an output terminal such as $A_{out}$ in FIG. 10 is a one or a zero. It may only be necessary to know that if a certain number, for example three, pulses are applied to the CLOCK UP or CLOCK DOWN input terminals, the appropriate number of transitions occurs at upper terminal $A_{out}$.

From the above description, it should be clear that the $INT^x$ signal is used on the input terminal CLEAR; and that the next preliminary signal $INT^{xx}$ is connected to the LOAD terminal. This then allows the counter to be preset in accordance with the signals applied on the input terminals $A_{in}$ through $D_{in}$.

TRANSISTOR DETECTOR

Figure 12:
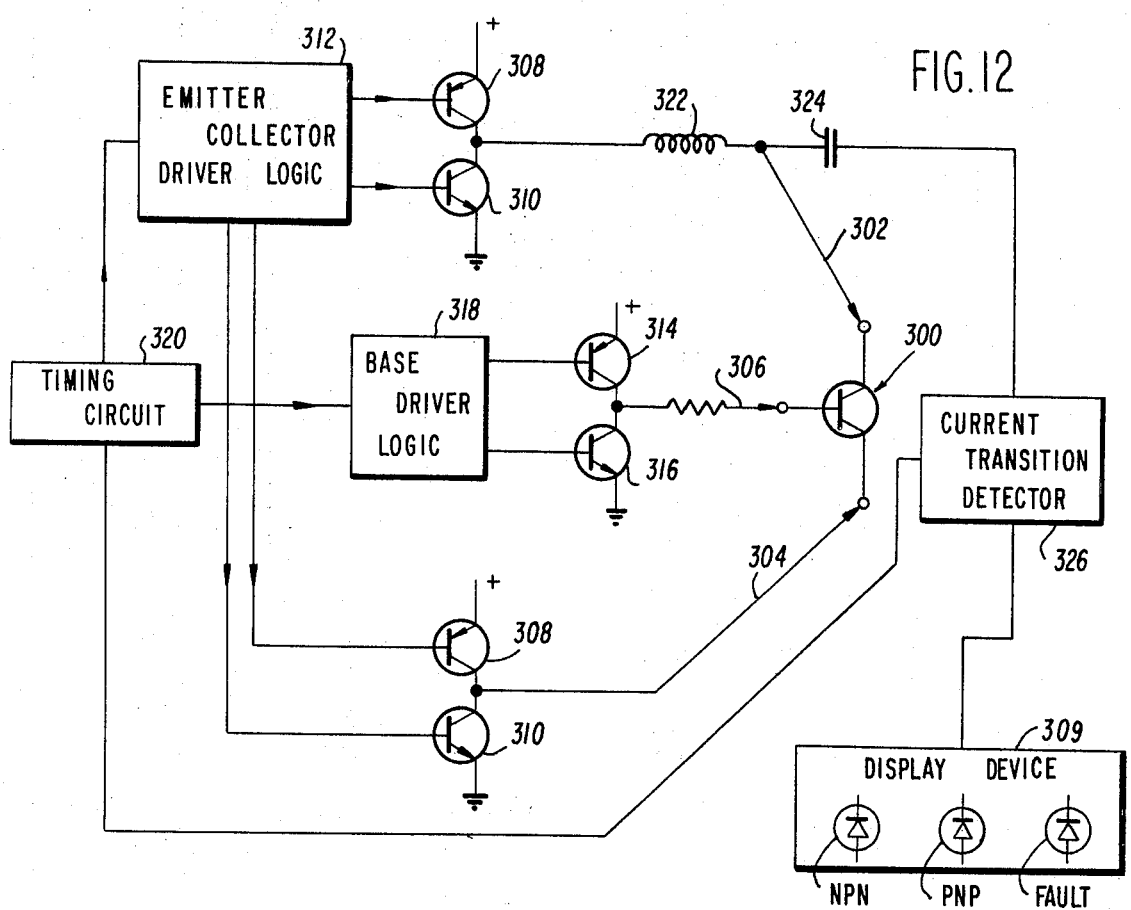
FIG. 12 is a diagram of an alternative test apparatus embodying certain of the concepts of the present invention wherein the appparatus is adapted for in-circuit testing of electrical components such as transistors.

A further form of the test apparatus embodying certain of the concepts of the present invention is illustrated in FIG. 12. In this embodiment, the electrical component being tested is a transistor 300 which may be connected in place on a printed circuit board, not shown. The connector member has terminals 302 and 304 which are adapted to be connected across the main current carrying terminals of the transistor and a pin 306 which is adapted to be connected to the base of the transistor under test. The display device 309 contains three light emitting diodes which are labeled NPN, PNP, and FAULT. The test apparatus here illustrated is capable of indicating whether the transistor is defective, in which case the FAULT light is energized, or is not effective to indicate whether it is an NPN or a PNP transistor.

Since it is not possible to easily determine from a mere inspection of the transistor housing whether the transistor is an NPN or PNP type, the test apparatus has current driver transistors connected as described in connection with FIG. 3 above.

The current driver transistors 308 and 310 are controlled by emitter, collector, driver logic indicated in block 312. The base of the transistor is controlled by current driver transistors 314 and 316 which in turn are controlled by base driver logic 318. The entire test sequence is controlled by the timing circuit 320.

In operation, operating voltage is applied during a first interval of time with the voltage on lead 302 being positive and the voltage on lead 304 being negative. Thereafter, a voltage pulse is applied to the base of a proper polarity to cause the transistor to conduct if it is an NPN type. Current conduction is detected by coil 322 and the current transition is coupled through condenser 324 to current transition detector 326, which in turn causes the NPN lamp to be energized.

A current transition may not be detected by reason of the transistor being either faulty or of the PNP type.

Therefore, a second stage of testing is automatically provided by the emitter-collector-driver logic circuit 312 which reverses the polarity of the voltage applied to transistor 300 and applied the positive voltage to terminal 304 and the negative voltage to terminal 302. Thereafter, the base driver logic 318 applies a pulse through base 306 and if a current pulse appears, the current transition detector 326 will then cause the PNP lamp to be illuminated.

At the end of these two test cycles, if neither the NPN lamp nor the PNP lamp is illuminated, the logic in the current transition detector circuitry 326 is such as to cause the FAULT lamp to become illuminated. Illumination of the FAULT lamp indicates that transistor 300 either failed to conduct under either of the test conditions or conducted under both test conditions.

In both cases, the amount of voltage and current that is applied to the transistor 300 for the purpose of checking its correct operation is insufficient to cause damage, even when applied in the opposite polarity to that intended. No damage is done to either the transistor 300 under test or to any other circuit component on the printed circuit board since the duration of the test can be held to a period on the order of about 1 to 3μ seconds.

SUMMARY OF ADVANTAGES

There has thus been described test apparatus and methods for troubleshooting printed circuit boards having discrete circuit components and integrated circuit components where these components can be tested while they are in place on a printed circuit board together with all of the other components attached to the board. This eliminates the need for unsoldering the components for testing to determine whether or not a component is faulty. The principles used by the test apparatus of the present invention avoids damage to both the component under test and the other components on the printed circuit board. The apparatus can detect faulty ICS or transistors with inputs/outputs shorted or open; it can detect shorted bands or solder splashes; and good and bad components can be isolated even in common logic circuits.

In use of the test apparatus of the present invention, for testing IC packages, it is necessary to have sufficient information concerning the logic on the printed circuit board to provide a truth table for checking the IC package. Once a truth table has been derived for a particular printed circuit board and components mounted thereon, the procedure for using the test apparatus is straightforward and requires little effort. In applications where there are a large number of IC housings on a printed circuit board, it may be useful to produce the test instructions in a memory unit such as a cassette tape, in which case the speed and accuracy of checking fifty, one hundred, or more IC packages on a single printed circuit board can be significantly accelerated. With less complex devices, such as transistors, less sophistication is required for the test apparatus and the test for faulty components can be quickly and easily made with very little software required.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. Electrical circuit test apparatus for use with a support base having electrical conductors and a plurality of housings mounted on said support base, each of said housings having a plurality of electrical terminals which serve as electrodes for active circuits contained in said housings with the electrical terminals on one housing being directly connected to electrical terminals on the other housings for transmitting electrical signals therebetween; said apparatus being characterized by having a connector member comprising a plurality of electrical terminals adapted to simultaneously engage the electrical terminals on one of said housings while said housing is on said support base with its terminals connected to said electrical conductors, said member being adapted to be selectively placed on different ones of said housings one at a time in seriatim to thereby test the circuits in the housings individually; and circuit means connected to the individual terminals of said connector member for supplying a signal voltage having an amplitude sufficient to test proper operation of an active circuit during a period of less than about 10μ seconds to be sufficiently short to prevent damage to electrical components not being tested by said signal voltage that are in housings connected to said support base and for producing an indication of the operation of the tested circuit, said indication lasting beyond the end of the test period.

2. Apparatus of claim 1 wherein the circuit means includes a first current driver circuit for supplying a power level voltage to a first pair of terminals on said component housing; a second current driver circuit for supplying said signal voltage to a component housing terminal not in said first pair; and a timing circuit for initiating said signal voltage of limited duration after the power level voltage has been initiated.

3. Apparatus of claim 2 wherein the circuit means for producing an indication of the operation of the tested circuit comprises means responsive to a change in the current conductivity of said active circuit under test during the testing period for producing a visual manifestation thereof which persists after the test period has concluded.

4. Apparatus of claim 3 wherein said means responsive to a change in current conductivity includes a counting circuit and the visual manifestation is provided by a digit display device connected to the counting circuit.

5. Apparatus of claim 3 wherein each housing has a plurality of active circuits and the circuit means of said test apparatus comprises for each active circuit first and second current driver circuits for supplying power level voltages and for supplying signal voltages; and a timing circuit connected to said driver circuits for simultaneously testing all of the circuits in a housing.

6. Apparatus of claim 1 wherein the circuit means for producing an indication of the operation of the tested circuit includes means responsive to a change in the current conductivity of the active circuit under test during the test period for producing a visual manifestation which persists after the test period has concluded.

7. Apparatus of claim 1 wherein the housings contain integrated circuits and said circuit means comprises a pair of current driver means for selectively supplying predetermined voltages to each of said terminals; program means for controlling each of said current driver means to selectively supply power or signal voltage or to inhibit said current driver means; and timing circuits connected to each current driver means for providing power voltages where programmed to be supplied to the various connector member pins, said timing circuits also serving to limit the duration of the signal voltages to provide a test period of less than about $10\mu$ seconds.

8. Apparatus of claim 7 wherein the circuit means for producing an indication of the operation of the tested circuits includes a predict register for each connector member terminal and connected to be controlled by said program means; a result register connected to each connector member terminal; and a circuit controlled by said timing circuits for comparing the contents of the predict and result registers at the end of said test period.

9. Apparatus of claim 1 whrein said circuit means for producing an indication of the operation of the tested circuit includes a predict register connected to be controlled by an operator; a result register connected to a terminal of the circuit under test; and indicating means connected to be responsive to a comparison in the predict and result registers.

10. Apparatus as defined in claim 1 wherein the signal voltage comprises a plurality sequential pulses with each pulse being applied to a different housing terminal and the indication is initiated only during the duration of the last of said plurality of pulses.

11. Apparatus as defined in claim 1 wherein the signal voltage comprises a plurality of simultaneously generated pulses each of which are applied to a different housing terminal.

12. Apparatus as defined in claim 11 wherein the simultaneously generated pulses have opposite polarities.

13. Apparatus for testing logic circuits packaged in housings having dual rows of in-line terminals while said housings are in circuit on a printed circuit board comprising a connector member having dual rows of in-line pins and being adapted for connection to the terminals of one of said housings; circuit means connected to the individual pins of the connector member for supplying voltages to test the proper operation of the logic circuits in a housing, said circuit means including timing circuits for applying said voltages for a test period that is sufficiently short to prevent damage to logic circuits in other housings on said circuit board; and means for producing an indication of the operation of the tested circuits at the end of the test period, said indication lasting beyond the end of the test period.

14. Apparatus of claim 13 wherein said circuit means further includes: current driver means for selectively supplying predetermined voltages to each of said pins and program means for controlling each of said current driver means to selectively supply power or signal voltages or to inhibit said current driver means; and wherein the timing circuits are connected to each current driver means for providing power voltages where programmed to be supplied to the various connector member pins, said timing circuits also limiting the duration of the signal voltages to less than about $10\mu$ seconds.

15. Apparatus of claim 14 wherein said indicating means comprises a predict register for each connector member pin and connected to be controlled by said program means, a result register connected to each connector member pin, and a further circuit means controlled by said timing circuits for comparing the contents of the predict and result registers at the end of the application of said signal voltages.

16. Apparatus of claim 13 wherein said circuit means further includes a program means and current driver means for selectively supplying predetermined voltages to a plurality of said pins in response to operation of said program means; and wherein said timing circuits include gating signal generators which produce during each test cycle a first signal to control generation of power level voltages by said current driver means, a second signal to control generation of signal voltages by said current driver means, and a third signal to terminate the test cycle sufficiently soon after the generation of the second signal to prevent damage to logic circuits in other housings on said circuit board.

17. Apparatus of claim 16 wherein the timing circuits which generate said second signal include a counting circuit for producing a plurality of pulses, and circuit connections between said program means and said timing circuits whereby the number of pulses produced in said second signal is determined by said program means.

18. Apparatus of claim 17 wherein the timing circuits which generate said second signal include means for generating a preliminary signal which occurs ahead of the first of said plurality of pulses whereby during the testing of a counter circuit, said preliminary signal is used to set a predetermined count in said counter before said plurality of pulses are produced.

19. Apparatus of claim 17 wherein said indicating means includes a transition detector adapted to be connected to a connector member pin, a counter circuit connected to the output of said transition detector, and means for indicating the number of transitions on said connector member pin during said test cycle.

20. A method for individually testing integrated circuit packages in seriatim while mounted on a circuit board and in circuit by test apparatus having a multipin connector member adapted to be engaged with and be removed from terminals on each package as the package is tested, said method comprising:
   a. applying said connector member to terminals of a first package to be tested with different pins engaging different ones of said terminals while the integrated circuit package remains electrically connected in the circuit;
   b. testing each circuit package during one or more test cycles with each test cycle including the steps of:
      i. applying an operating power voltage level across selected ones of said connector pins;
      ii. thereafter applying one or more signal voltages to other connector pins for causing said circuit, if operating properly, to assume a predicted mode of operation, said signal voltage being applied for a duration of time sufficiently short to prevent damage to other circuit packages connected in the circuit but not under test;
      iii. comparing the actual mode of operation assumed by the circuit under test with a predicted mode of operation;

c. thereafter removing said connector member from said first circuit package to a second circuit package on the same circuit board; and
d. testing the second package by repeating steps (i), (ii), and (iii) recited above.

21. The method of claim 20 further including the step of providing in the test apparatus for each terminal of said package a separate program selector, a separate current driver and a separate register, and wherein the test cycle includes also the steps of controlling the current drivers by adjusting the program selector, and comparing the signal in the register with a predicted signal to indicate the proper operation of the package under test.

22. The method of claim 21 further including the step of providing in the test apparatus a timing circuit, and wherein the test cycle includes also controlling the current drivers by signals received from said timing circuit to thereby effect the applying of the operating power voltage levels at a first time during each test cycle and the applying of the signal voltages at a subsequent time during each test cycle; and at the end of said test cycle removing said voltage levels and signal voltages substantially simultaneously after the registers have assumed a condition resulting from the test cycle.

23. A method of testing IC units while the IC units are electrically connected in a digital circuit arrangement comprising:
simultaneously accessing all the terminals of an IC unit to be tested;
initiating a test cycle which includes supplying signal voltages on selected input terminals with sufficient drive to force the IC circuit to function in a predetermined manner, said voltages being applied for a time period sufficiently short to prevent damage to other IC units in the circuit arrangement; and
monitoring the voltage level on the terminals of the IC unit under test by storing the voltage levels on the terminals at the end of the test cycle and comparing the stored voltage levels with predicted voltage levels.

24. The method of claim 23 further including the steps of:
providing a predict register for each terminal of the IC unit to be tested;
providing a storage register that is connected to each terminal of the IC unit under test; and
adjustably controlling a programming member to provide all of the voltage levels for each of the predict registers.

25. The method of claim 24 further including the step of adjustably controlling the programming member to control the polarity and timing of voltages that are supplied to said selected input terminals.

26. The method of claim 24 wherein the test cycle includes the steps of:
generating logical one and zero power voltage levels which are applied to predetermined terminals of the IC unit under test;
then after a stable conduction condition has been established in the IC unit under test, generating said signal voltages for a period of not longer than about 10 seconds; and
at the end of said test cycle, generating a signal which causes the voltage levels on the terminals of the IC unit under test to be stored and compared with the voltage levels in the predict register.

27. The method of claim 26 wherein the IC unit is a binary counting circuit, and the step of supplying signal voltages includes the steps of clearing said counting circuit with a first signal, then entering a predetermined count into said counting circuit with a second signal, and thereafter adding a predetermined number of counts to the count in said counting circuit with a third signal.

28. A method for testing electronic circuit components while connected in an electrical circuit and mounted on a circuit board without damage to associated components on the same circuit board comprising the steps of:
accessing the individual terminals of the component to be tested;
applying operating voltage levels to selected ones of said terminals of the component under test for a first time period;
after the start of and during said time period when the resultant voltages in the circuit have stabilized subsequently applying during a brief second time period a signal voltage to a terminal of said component under test, said operating voltage and signal voltage having an amplitude and duration (i) sufficient to cause the tested component to attain temporarily a predicted conducting condition but (ii) insufficient to cause damage to said associated components connected in the same circuit; and
producing an indication in response to operation of said tested component at the end of said time period, said indication lasting significantly beyond the end of the period during which said operating and signal voltage are applied.

29. The method of claim 28 wherein the components are packaged in housings having multiple terminals soldered to a printed circuit member and wherein said operative voltage levels and signal voltages are applied to selected housing terminals by:
providing a separate control circuit for each housing terminal;
adjusting each control circuit to selectively provide a voltage level, a signal voltage, or no voltage; and
actuating a timing circuit which causes the control circuits to apply to the housing terminals first the voltage levels, then the signal voltages and thereafter actuates circuit arrangements for producing the indication of operation of the circuits in the housing tested.

30. The method of claim 29 wherein voltage levels are applied to said housing terminals by providing a separate current driver circuit for each terminal including two normally non-conducting transistors connected in series across positive and negative poles of a power supply, and actuating one or the other but not both of said transistors to selectively apply to the various housing terminals either a logical one or zero voltage level.

31. The method of claim 29 wherein the signal voltages are applied to said housing terminals by providing a separate current driver circuit for each terminal including two normally non-conducting transistors connected in series across positive and negative poles of a power supply, and actuating one or the other but not both of said transistors to selectively apply to the various housing terminals either a logical one or zero signal voltage.

32. The method of claim 29 wherein voltage levels are applied to said housing terminals by providing a pair of separate current driver circuits for each terminal and actuating either one driver circuit to supply said voltage levels or the other driver circuit to supply said signal voltage.

33. The method of claim 32 wherein said current driver circuits are selected in response to the adjustment of the associated control circuit, and the actuation of the selected current driver circuit for each terminal is controlled by gating signals generated from a timing circuit.

34. The method of claim 33 wherein each current driver circuit comprises two normally non-conducting transistors connected in series across positive and negative poles of a power supply with the connection to the housing terminal being at a common junction between said transistors, and the selected voltage level or signal voltage for each terminal is provided by causing only one of the four transistors connected to such terminal to be conductive during a test cycle.

35. Apparatus for in-circuit testing of transistors, said apparatus having terminals adapted for connection to the emitter, collector and base terminals of the transistor under test and comprising:
a source of direct current voltage,
current driver circuits capable of providing either of two polarities of voltage, connected to said voltage source and to each of said apparatus terminals;
timing and logic circuits connected to control said current driver circuits and effective with each transistor being tested to cyclically produce in cooperation with said voltage source:
  i. during a first time period a voltage difference of a first polarity between the terminals adapted to be connected across the emitter and collector terminals,
  ii. during a second time period a voltage difference of opposite polarity between the same terminals,
  iii. during each of said time periods a voltage pulse having an amplitude, polarity and duration sufficient to cause a current flow in the emitter-collector circuit of a properly operating transistor under test during only one of said time periods but insufficient to cause damage to any other electrical circuit components connected in-circuit with said transistor; and
a display device including a current transistion detector to detect a presence or absence of a current flow in the emitter-collector circuit for indicating a faulty transistor.

36. Apparatus as defined in claim 35 wherein the display device includes a first visual signal for identifying an operative P-N-P transistor, a second visual signal for identifying an operative N-P-N transistor, anad a third visual signal for identifying a faulty transistor.

37. A method for in-circuit testing of transistors while electrically connected to electrical conductors on a support base and to other circuit components that are unpowered except for voltages applied during a test period, said method being characterized by:
providing a probe having a plurality of electrical terminals adapted to simultaneously engage all the electrical terminals on the transistor under test while the transistor is on said support base with its terminals connected to said electrical conductors;
applying an operating direct voltage level of a first polarity to the collector and emitter terminals of said transistor under test for a first time period;
during said first time period, applying a first signal voltage to the control terminal of said transistor under test, the start of said first signal voltage being delayed for a period sufficient to allow the previously applied voltage level to reach a steady condition, said first signal voltage having an amplitude and duration
  i. sufficient to cause the tested transistor to attain temporarily a predicted conducting condition if the transistor is not faulty and the polarity of the operating voltage level is proper, but
  ii. insufficient to cause damage to said associated components connected in the same circuit;
producing an indication in response to proper operation of said tested transistor at the end of said time period, said indication lasting significantly beyond the end of the period during which said signal voltage is applied;
thereafter applying an operating direct voltage level of reversed polarity to the collector and emitter terminals of said transistor under test for another time period;
during said other time period, applying a second signal voltage to the control terminal and said transistor under test, the start of said second signal voltage being delayed for a period sufficient to allow the previously applied voltage level to reach a steady condition, said second signal voltage having an amplitude and duration
  i. sufficient to cause the tested transistor to attain temporarily a predicted conducting condition if the transistor is not faulty and the polarity of the operating voltage level is proper, but
  ii. insufficient to cause damage to said associated components connected in the same circuit; and
producing an indication in response to proper operation of said tested transistor at the end of said other time period, said indication lasting significantly beyond the end of the period during which said signal voltage is applied.

38. The method as defined in claim 37 including the further step of producing an indication of a faulty transistor after the end of the second time period in the event no indication of proper operation is produced during either of said time periods.

* * * * *

UNITED STATES PATENT OFFICE
CERTIFICATE OF CORRECTION

Patent No. 3,870,953  Dated March 11, 1975

Inventor(s) Roger M. Boatman and Melvin R. Hall

It is certified that error appears in the above-identified patent and that said Letters Patent are hereby corrected as shown below:

Claim 7  Col. 19  line 6,  change "voltage" to --voltages--.

Claim 28  Col. 22  line 18,  before "first" insert --brief--.
                   line 32,  change "period" to --periods--.
                   line 33,  change "voltage" to --voltages--.

Claim 35  Col. 23  line 32,  before "first" insert --brief--.
                   line 32,  before "voltage" insert --operating-- and change "a" to --an--.
                   line 36,  before "second" insert --brief--.
                   line 36,  before "voltage" insert --operating-- and change "a" to --an--.
                   line 38,  before "time" insert --brief--.
                   line 38,  before "voltage" insert --signal--.
                   line 43,  after "periods" insert a comma.
                   line 43,  cancel "but" and insert --said brief periods of said operating and signal voltages being--.
                   line 46,  cancel "a display device" and insert --an indicator means--.

UNITED STATES PATENT OFFICE
CERTIFICATE OF CORRECTION

Page - 2

Patent No. 3,870,953        Dated    March 11, 1975

Inventor(s) Roger M. Boatman and Melvin R. Hall

It is certified that error appears in the above-identified patent and that said Letters Patent are hereby corrected as shown below:

continued

Claim 37    Col. 24    line 8,     after "voltage" cancel "level".
                       line 10,    before "first" insert --brief--.
                       line 11,    after "applying" insert --for a brief period--.
                       line 15,    after "voltage" cancel "level".
                       line 16,    after "said" insert --operating voltage and--.
                       line 23,    after the semicolon insert --and--.
                       line 29,    after "voltage" cancel "level".
                       line 32,    before "time" insert --brief--.
                       line 34,    after "terminal". cancel "and" and insert --of--.
                       line 37,    after "voltage" cancel "level".
                       line 38,    before "said" insert --the latter operating voltage and--.
                       line 49,    change "period" to --periods--.

Signed and Sealed this fourteenth Day of October 1975

[SEAL]

Attest:

RUTH C. MASON                    C. MARSHALL DANN
*Attesting Officer*              *Commissioner of Patents and Trademarks*